United States Patent [19]

Fenner, Jr.

[11] Patent Number: 5,427,132
[45] Date of Patent: Jun. 27, 1995

[54] TEMPERATURE COMPENSATING PRESSURE REGULATOR

[76] Inventor: Thomas C. Fenner, Jr., 8081 S. Kendall Blvd., Littleton, Colo. 80123

[21] Appl. No.: 181,084

[22] Filed: Jan. 13, 1994

[51] Int. Cl.$^6$ ............................................. F16K 17/38
[52] U.S. Cl. ....................................... 137/79; 251/250
[58] Field of Search ............................ 137/79; 251/250

[56] References Cited

U.S. PATENT DOCUMENTS

| | | | |
|---|---|---|---|
| 760,443 | 5/1904 | Fulton | 137/79 |
| 1,236,953 | 8/1917 | Lewis | 137/505.14 |
| 2,256,319 | 9/1941 | Johnson | 251/250 |
| 3,104,862 | 9/1963 | Pearson et al. | 251/250 |
| 3,218,024 | 11/1965 | Kroekel | 251/250 |
| 4,883,082 | 11/1989 | Pirkle | 137/79 |
| 5,174,326 | 12/1992 | Steinert | 137/505.14 |

FOREIGN PATENT DOCUMENTS 0116667  8/1984  European Pat. Off. ............ 137/79

Primary Examiner—A. Michael Chambers
Attorney, Agent, or Firm—Gary M. Polumbus; Holland & Hart

[57] ABSTRACT

The temperature compensating pressure regulator (TCPR) allows a modified constant output pressure regulator to change its output pressure in response to changes in the ambient temperature. Furthermore, the changes in the ambient temperature are extrapolated to estimate the changes in a mass which is in the same ambient environment. The best mode teaches a beer keg application. A wax filled container expands in relation to the temperature changes in a cold storage room. The thermal expansion coefficient of the wax and impurities therein simulate the temperature changes in a keg of beer in the same cold storage room. Upon responding to a temperature change, the TCPR adjusts the keg pressure to the brewer's predetermined pressures, thereby maintaining the proper $CO_2$ solution in the beer.

Further embodiments include controlling a quarter turn valve with a wax element having a controllable heating coil and controlling the TCPR with a controllable heating coil. Another embodiment teaches a self-contained automatic freezing temperature shut off valve.

14 Claims, 9 Drawing Sheets

TEMPERATURE (°F) OF BEER IN KEG

| ELEVATION OF ACCOUNT | 30 | 31 | 32 | 33 | 34 | 35 | 36 | 37 | 38 | 39 | 40 | 41 | 42 | 43 | 44 | 45 |
|---|---|---|---|---|---|---|---|---|---|---|---|---|---|---|---|---|
| 14,001-15,000 | 19 | 19 | 20 | 20 | 21 | 21 | 22 | 22 | 23 | 23 | 24 | 24 | 25 | 25 | 26 | 26 |
| 13,001-14,000 | 18 | 19 | 19 | 20 | 20 | 21 | 21 | 22 | 22 | 23 | 23 | 24 | 24 | 25 | 25 | 26 |
| 12,001-13,000 | 18 | 18 | 19 | 19 | 20 | 20 | 21 | 21 | 22 | 22 | 23 | 23 | 24 | 24 | 25 | 25 |
| 11,001-12,000 | 17 | 18 | 18 | 19 | 19 | 20 | 20 | 21 | 21 | 22 | 22 | 23 | 23 | 24 | 24 | 25 |
| 10,001-11,000 | 17 | 17 | 18 | 18 | 19 | 19 | 20 | 20 | 21 | 21 | 22 | 23 | 23 | 24 | 24 | 24 |
| 9,001-10,000 | 16 | 17 | 17 | 18 | 18 | 19 | 19 | 20 | 20 | 21 | 21 | 22 | 22 | 23 | 23 | 24 |
| 8,001-9,000 | 16 | 16 | 17 | 17 | 18 | 18 | 19 | 19 | 20 | 20 | 21 | 21 | 22 | 22 | 23 | 23 |
| 7,001-8,000 | 15 | 16 | 16 | 17 | 17 | 18 | 18 | 19 | 19 | 20 | 20 | 21 | 21 | 22 | 22 | 23 |
| 6,001-7,000 | 15 | 15 | 16 | 16 | 17 | 17 | 18 | 18 | 19 | 19 | 20 | 20 | 21 | 21 | 22 | 22 |
| 5,001-6,000 | 14 | 15 | 15 | 16 | 16 | 17 | 17 | 18 | 18 | 19 | 19 | 20 | 20 | 21 | 21 | 22 |
| 4,001-5,000 | 14 | 14 | 15 | 15 | 16 | 16 | 17 | 17 | 18 | 18 | 19 | 19 | 20 | 20 | 21 | 21 |
| 3,001-4,000 | 13 | 14 | 14 | 15 | 15 | 16 | 16 | 17 | 17 | 18 | 18 | 19 | 19 | 20 | 20 | 21 |
| 2,001-3,000 | 13 | 13 | 14 | 14 | 15 | 15 | 16 | 16 | 17 | 17 | 18 | 18 | 19 | 19 | 20 | 20 |
| 1,001-2,000 | 12 | 13 | 13 | 14 | 14 | 15 | 15 | 16 | 16 | 17 | 17 | 18 | 18 | 19 | 19 | 20 |
| SEA LEVEL 1-1,000 | 12 | 12 | 13 | 13 | 14 | 14 | 15 | 15 | 16 | 16 | 17 | 17 | 18 | 18 | 19 | 19 |
| -1,001-0 | 11 | 12 | 12 | 13 | 13 | 14 | 14 | 15 | 15 | 16 | 16 | 17 | 17 | 18 | 18 | 19 |

PRESSURE (POUNDS)

*Fig. 1*

TEMPERATURE COMPENSATING PRESSURE REGULATOR

Co-pending U.S. application Ser. No. 08/060,377 filed May 11, 1993 by the present inventor is incorporated herein by reference.

FIELD OF INVENTION

The present invention relates to regulating gas pressure in response to changing environmental temperatures. This invention is especially significant for controlling draught beer flow, remote temperature sensing, remote pressure set point control, swamp cooler and sprinkler system automatic shut off at freezing temperatures.

BACKGROUND OF THE INVENTION

The present invention originated to improve the control of dispensing draught beer in commercial establishments. However, other applications taught herein are any fluid or gas system which requires a linear or any predetermined relationship between temperature variations and pressure output. These include swamp cooler and sprinkler system shut down during freezing ambient temperatures.

In commercial establishments including bars and restaurants it is customary to store beer kegs inside walk-in cold storage refrigerators. These walk-in cold storage refrigerators can store many beer kegs of various brands. Pressurized $CO_2$ is used to pump the draught beer from the keg to the bar.

Draught beer contains $CO_2$ in solution. The two most common elements that affect $CO_2$ levels in draught beer are elevation and temperature. If too much $CO_2$ escapes from the draught beer during the pumping to the bar, then excessive foam is created, and the beer loses carbonation and becomes flat tasting. FIG. 1 shows one typical temperature and elevation compensation chart for one type of draught beer. The idea is to maintain the $CO_2$ solution in the beer during pumping regardless of temperature variations in the cold storage refrigerator. $CO_2$ pressures in draught beer range between 11 psi and 26 psi depending on the brewer. The problem as yet unsolved in the art is how to properly compensate for temperature fluctuations caused by opening the door and from moving food stuffs at various temperatures in and out of the cold storage refrigerator.

FIG. 2 shows a layout of a walk-in refrigerator having a hypothetical computer controlled temperature compensated pressure regulating system. It is not economically feasible to install this system in a cold storage room. However, it is helpful to describe the functioning of the present invention by starting with a computer system model. This computer system computes the air temperature in the cold storage refrigerator and calculates the duration of time of any deviations from the norm. Then an algorithm is executed which simulates the temperature change of the beer (in nominally one half keg) during the measured temperature and time deviation of the ambient air in the cold storage refrigerator. Finally, a new pressure is calculated per the table in FIG. 1, and a new pressure is set on the pressure regulating valve to the keg. This computerized method of pressure compensation is too expensive since it requires a computer control loop.

Another known solution is to insert a temperature sensor directly into the keg. This method is also very expensive since it requires an approved probe in contact with publicly consumed beverages. It also requires bacteria and leak proof seals into the keg.

The present invention provides the same efficiency as the computer control loop noted above. However, the result is accomplished with an inexpensive temperature compensated pressure regulator valve. The basic principle uses a common pressure regulator valve having a temperature compensating adapter. The adapter has a closed compartment which encases an expandable fluid such as wax. When the wax expands during a rise in the ambient air temperature, it forces a piston down into the pressure regulator, thereby altering the spring tension in the regulator and increasing the output pressure. The closed compartment size, the thermal mass of the wax and the spring tension in the common regulator are designed to linearly compensate for a given volume of beer (nominally half a keg) over a set temperature range (30°–40° F.). The relationships described in FIG. 1 are maintained.

Thus, the control results of a costly computer system are duplicated in an inexpensive mechanical pressure regulator.

An alternate embodiment provides for the temperature sensitive wax element to be connected remotely to the pressure regulator by a cable. This allows flexibility in the routing of the pressure lines.

Another alternate embodiment converts the device into a remote pneumatic control actuator by adding a controllable heating element around the wax element. Thus, varying the electric current to the wax element varies the pressure output of the regulator.

A final embodiment teaches the combination of the device with a quarter turn valve. This combination can be used to automatically shut off swamp coolers and underground sprinklers upon the onset of freezing temperatures.

SUMMARY OF THE INVENTION

The main object of the present invention is to provide a simple mechanical temperature compensated pressure reducing regulator.

Another object of the present invention is to provide a means for adjusting the calibration of the pressure regulator to match various thermal masses of different substances including draught beer.

Another object of the present invention is to provide for a remote temperature sensor away from the pressure regulator.

Yet another object of the present invention is to provide a heated coil around the temperature sensor, thereby allowing direct adjustment of output pressure by means of varying the temperature of the coil.

Still yet another object of the present invention is to combine the temperature compensated pressure regulator with a quarter turn valve, thereby creating an automatic shut off valve in freezing temperatures.

Other objects of this invention will appear from the following description and appended claims, referenced being had to the accompanying drawings forming a part of this specification wherein like reference characters designate corresponding parts in the several views.

The best mode of the present invention is embodied in a temperature compensated pressure reducing regulator placed between a $CO_2$ tank and a keg of draught beer in a walk-in refrigerator. An assembly consisting of a container of wax mixed with copper impurities and an extending piston (available from Vernet ®, 91291 Arpajon Cedex, France) is mounted atop a traditional pressure reducing miniature regulator (Norgren Type R14 or R16). The extending piston pushes on the main pressure control spring of the miniature regulator. The mixture of the wax and copper has been selected to match the lag time between the change in air temperature in the walk-in refrigerator in the range of 30°–40° F. and the change in the temperature of half a keg of draught beer. The movement of the extending piston is matched to the proper pressure control spring in the miniature regulator to maintain the variables specified in the chart of FIG. 1.

The current form of the temperature compensated regulator can be modified for remote sensing of temperature source by using a wax actuator attached to a cable system. This allows the temperature element/wax actuator to be located remotely from the regulator. As an example the temperature element/wax actuator can be placed in the piping down stream from the boiler to monitor the actual temperature of the fluids being heated by the boiler. The sensed temperature would then be utilized to adjust the outlet pressure of the regulator and change the gas feed pressure to the boiler. In this manner no extra energy consumption is required other than that already being utilized to heat the fluid.

By wrapping the wax actuator with an electrical resistance coil, remote activation of the regulator is possible. The electrical signal to the coil may then be varied to cause the piston travel to increase or decrease thus increasing or decreasing the output pressure of the regulator. Thus, we can duplicate the functioning of a variable electric or pneumatic control actuator with a relatively inexpensive wax element pressure regulator ($100 versus $25). The device acts as a remote set point adjustment for a regulator. The wax element never sees the ambient temperature because the wax expansion factor doesn't start until 120° F.+.

The temperature compensated regulator can also be applied to quarter turn valves such as a ball valve or plug valve. By utilizing the stroke of the wax actuator to drive a rack gear, the torque provided by the wax actuator can be changed to a rotational force by the use of a pinion or round gear in contact with the rack. This rotational force is then applied to the stem of the ball or plug valve to change the orientation of the port in relationship to the body of the valve. This change in orientation causes the valve to open or close depending on the original starting point of the port in the ball or plug. The advantage to using a quarter turn ball valve for instance is that the porting configuration may be modified to provide either a full ported or full flow configuration to a reduced port or restricted configuration for flow control. In the full ported configuration there is no flow restriction to cause a pressure drop or means for collecting undesired debris allowing the valve to be used in a dirty system such as a drain valve for swamp coolers.

The wax composition of the actuator can then be adjusted to respond to a broad range of temperature spans or ranges depending on the application.

Use of the wax actuated quarter turn valve would be shown in a system where freezing of liquids is a problem. In this system the wax actuator would be conformed to contract and thereby move the rack when a temperature approaching freezing is experienced. Spring opposition of the rack would serve to drive the stem mounted pinion to open the valve and drain the contents of a swamp cooler for instance, thereby eliminating the destructive force of ice formation in an enclosed vessel. Conversely by switching the port orientation the valve would close and shut off flow to systems where freezing is detrimental.

In the same wax actuated valve system, an electrical resistance coil may be placed around the wax element. When electrical energy is applied to the coil heat is produced and the valve may be caused to open or close depending on valve port orientation to the pinion gear.

By utilizing two opposing wax actuators with electrical coils, electrical energy may be applied to one of the wax actuators to cause the valve to open or close. When electrical energy is applied to the opposite coil the valve is driven the opposite direction.

The electrical energy to either coil may be varied in intensity to allow the valve to be only partially opened or closed. A spring return may be added to any of aforementioned systems to cause the valve to fail open or fail closed on loss of electrical energy.

The wax actuator systems described above may be applied to a 3-way valve or diverter valve to cause changes in flow direction based on temperature changes or varied electrical energy.

BRIEF DESCRIPTION OF THE DRAWINGS

FIG. 1 is a chart of temperature and elevation changes versus pressure adjustment for maintaining the proper $CO_2$ solution in a brand of draught beer.

DETAILED DESCRIPTION

FIG. 1 shows how the pressure in a keg of beer must be increased in relation to either an increase in elevation or temperature. The required increase in keg pressure is necessary to keep the $CO_2$ in the beer. When the temperature rises the $CO_2$ expands and separates out of the beer. This leaves a flat taste in the beer and causes excessive foam. The darkened lines show that at sea level and at a temperature of 38° F., the pressure in the keg should be 16 p.s.i. Therefore, if the beer temperature rises to 40° F. due to the door opening to the cold storage room having the keg of beer, then the keg pressure must rise to 17 p.s.i.

Figure 2:
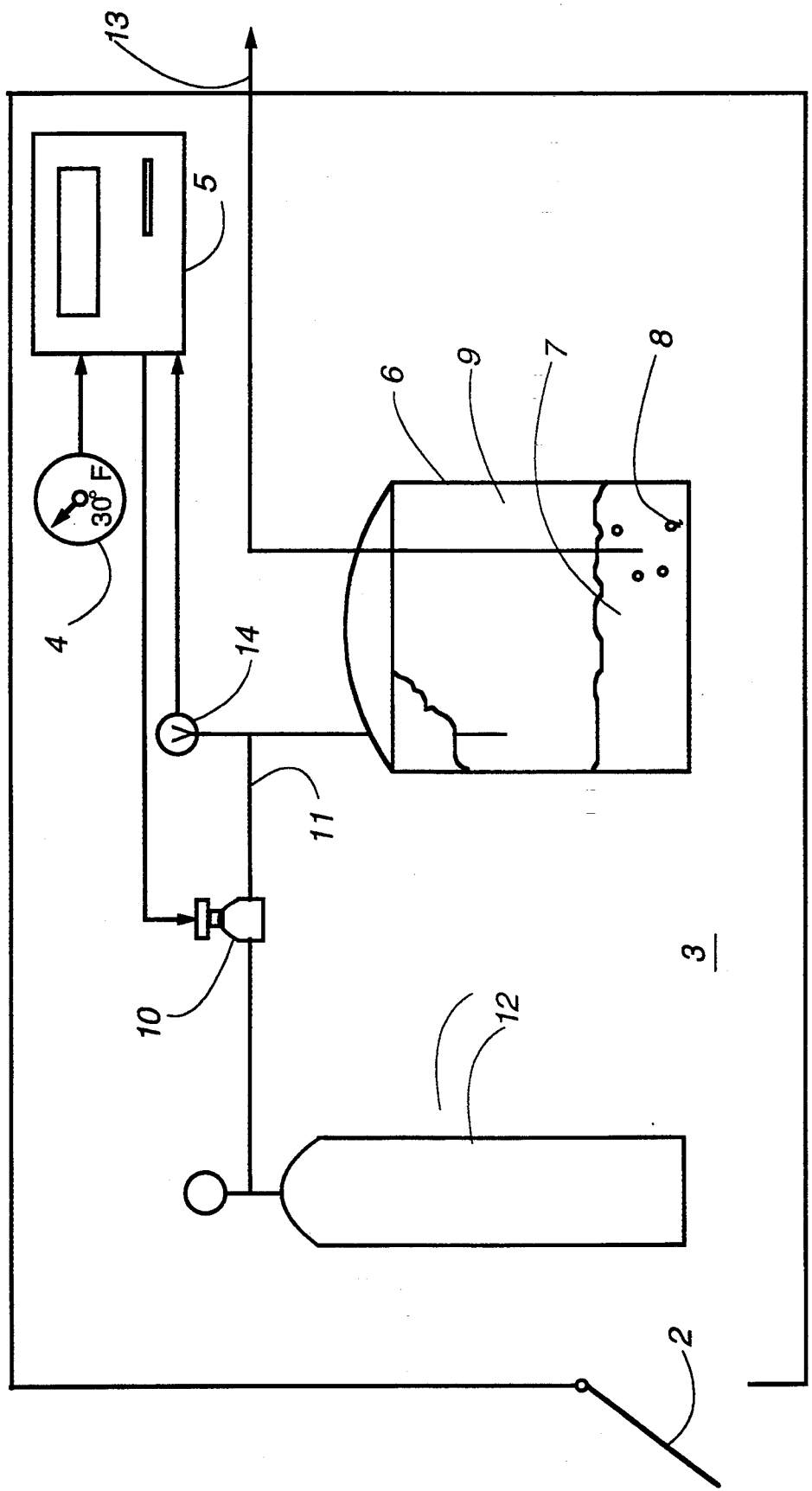
FIG. 2 is a block diagram of a known computer based method of controlling the pressure in the key for temperature changes of the air surrounding a keg of beer.

Referring next to FIG. 2, a computer controlled solution is housed in walk-in refrigerator 1. Opening door 2 causes a rise in the temperature of ambient air 3. This rise in temperature is sensed by sensor 4 and relayed to computer 5. Computer 5 then executes an algorithm which solves the following algorithm:

$$\Delta X = K^{(A,B)} \Delta T$$

K can be tailored by altering the thermal sensing media to emulate the thermal mass of a wide variety of materials. X is the pressure in the keg. $K^{(A,B)}$ may be a linear, non-linear, or adjustable time constant.

This equation estimates the temperature of the beer based on the change in temperature in the ambient air 3 as sensed by temperature sensor 4.

In operation the $CO_2$ tank 12 pressurizes the pressure cavity 9 in the beer keg 6 through $CO_2$ pipe 11. A pressure sensor 14 sends the measured pressure cavity pressure to the computer 5. The computer 5 estimates the beer temperature based on readings from the ambient air temperature gauge 4. Then the computer 5 controls the pressure regulating valve 10 to meet the predetermined proper pressure as defined by the chart in FIG. 1. The result is that the $CO_2$ 8 remains in solution in the beer 7 even with temperature fluctuations in the ambient air 3. Thus, the draught beer output 13 remains tasty, not flat, and not too foamy.

Figure 3:
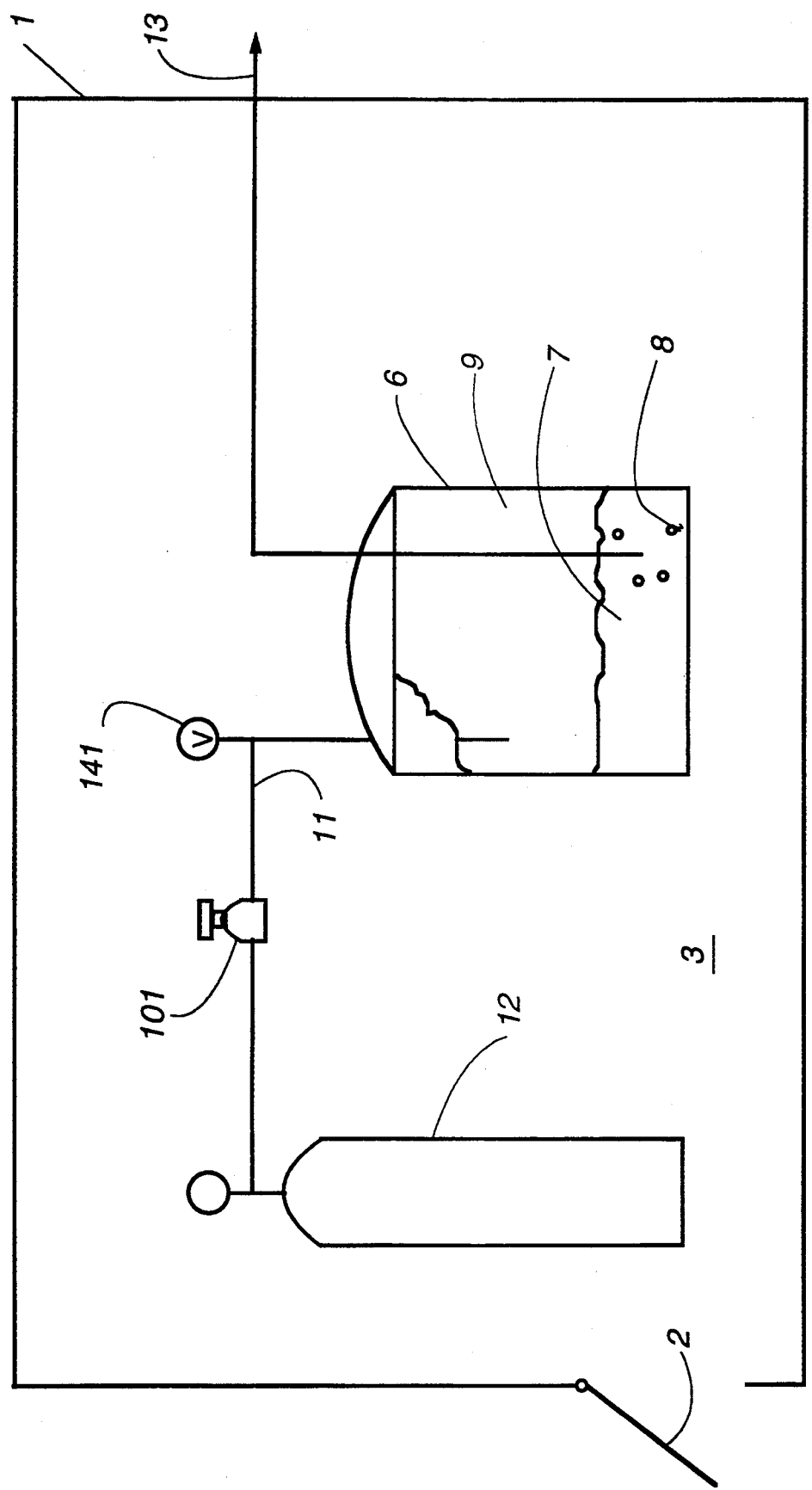
FIG. 3 is a block diagram of the cold storage room of FIG. 2, but with the installation of the present invention.

Referring next to FIG. 3 a temperature compensating pressure regulator (TCPR) 101 has replaced the computer 5, the temperature sensor 4 and the pressure sensor 14 of FIG. 2. The TCPR 101 performs the same tasks as these deleted items. The draught beer output 13 is the same. The pressure gauge 141 is merely an option to allow the visual inspection of the pressure in the pressure cavity 9.

The operation of the present invention depends upon several parameters in order to compensate for temperature changes in the environment. Since the function of the present invention is to change the pressure proportional to temperature fluctuations for any application, there is a direct correlation between the outside temperature and the internal control pressure of the keg. This correlation is dependent upon the makeup of the wax and the pressure control spring of the regulator. (FIG.4, 50) The wax is composed of elements of copper and carbon. For the present beer application the wax is 90% (C12-C13-C14) polyolifin by volume and 82% copper by mass. These elements are bonded to give the proper thermal coefficients to compensate for the temperature variations in the environment. Also, the spring constant of the pressure control spring is temperature sensitive and is part of the correlation.

The following equation provides a thermodynamic approach for correlating the pressure and temperature variations of the present invention:

$$\Delta P = \Delta T C_1 \exp\left(\frac{a_1 h_1}{k_1 R o_1}\right) + \frac{K_2}{L_2} \quad \text{equation (1)}$$

$a_1$ = thermal diffusivity of wax
$h_i$ = convection coefficient of wax
$k_1$ = thermal conductivity coefficient of wax
$Ro_1$ = characteristic dimension of wax
$K_2$ = spring constant
$L_2$ = spring length
$C_1$ = correlation coefficient of wax This equation shows that as the temperature changes in the container, the wax and spring temperatures will change, activating the valve according to equation (1) to provide for an increase in the container pressure. This valve is unique in that the response is related to the physical characteristics of the valve, and not a sophisticated electronic feedback system. The regulator can be fitted for any application by adjusting the constants (through physical adjustments of the valve components) as shown in equation (1). Because of the simplicity and direct correlations of the parameters in the equation, the repeatability and accuracy of the regulator should be very good.

Figure 4:
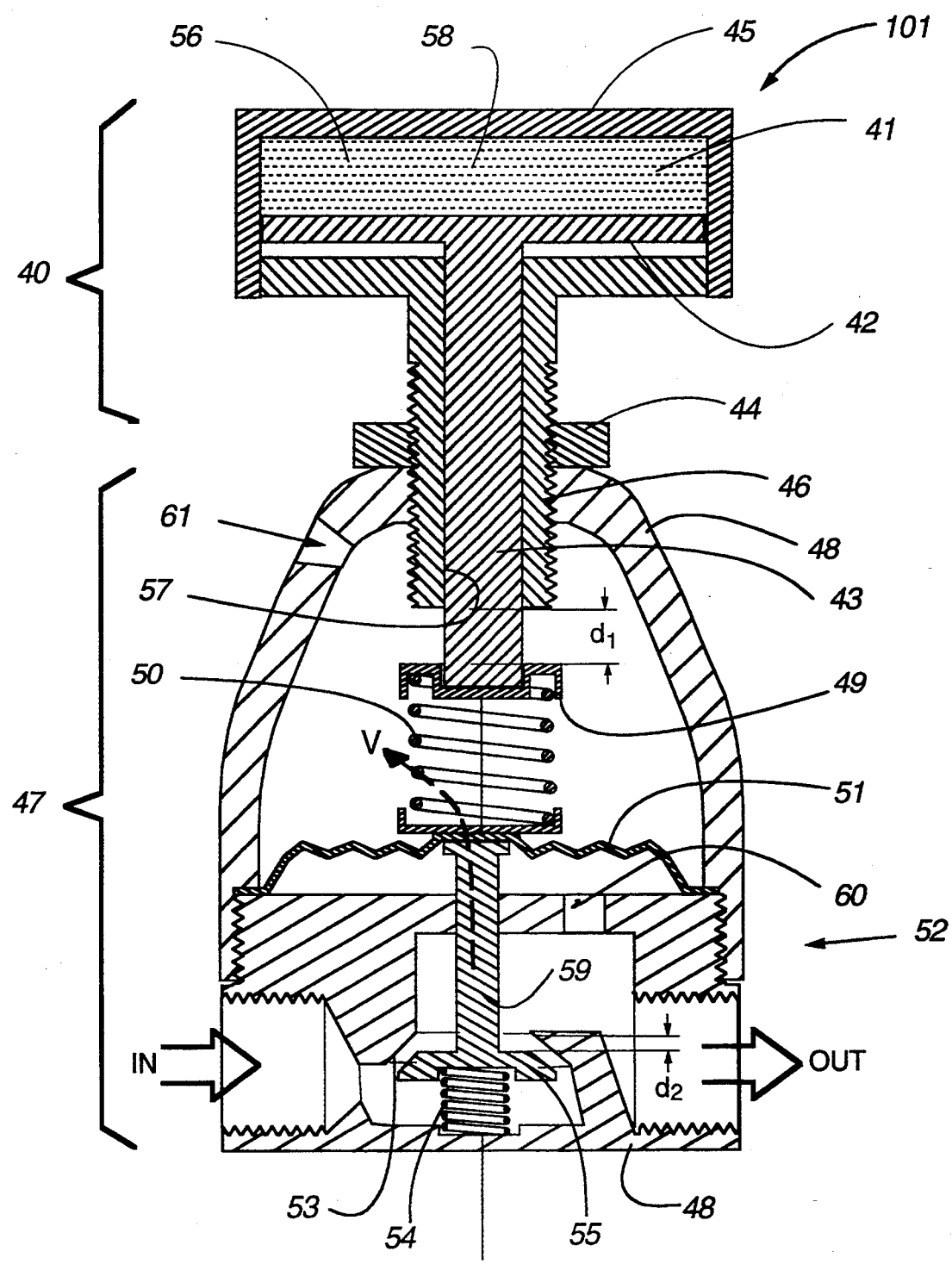
FIG. 4 is a longitudinal sectional view of the temperature compensating regulator 10 shown in FIG. 3.

Referring next to FIG. 4 the TCPR 101 is shown in an enlarged cross sectional view. A miniature regulator 47 has been modified to accept a temperature element 40. The miniature regulator 47 could be a Norgren ® Type R14. The Norgren ® Type R14 miniature regulator is designed for use with compressed gas. They are usually used for applications that require a constantly maintained reduced pressure. Applications usually include maintaining a 30 psig pressure to blow guns to meet OSHA requirements as well as machine installations requiring a set pressure that does not change with demand.

The miniature regulator 47 has been combined with a temperature element 40 having an outer case 45. A piston 42 is slidingly engaged inside the outer case 45. A wax 41 having copper impurities 56 is sealed between the outer case 45 and the piston 42. When the temperature of the ambient air 3 increases or decreases, it causes the wax 41/copper 56 to expand or contract accordingly. A piston rod 43 is thereby caused to move over a variable distance $d_1$. A pressure control spring 50 absorbs a selectable amount of the movement of the piston rod 43. Then the pressure control spring 50 transmits the movement of the piston rod 43 to the diaphragm 51. The diaphragm 51 is connected to the valve stem 59 which holds the valve plug 55 in the valve seat 53. The valve plug 55 moves over a distance $d_2$.

The inlet port is denoted as IN, and the output port is denoted as OUT. A spring guide 49 holds the pressure control spring 50 in place. A balancing spring 54 pushes the valve plug 55 back toward the closed position to reduce the output pressure when the ambient temperature decreases and causes the wax 41 to contract.

The segment 52 of the miniature regulator 47 is the pressure reducing valve. The bonnet 48 is the outer case of the miniature regulator 47. A lock nut 44 locks the temperature element 40 inside the miniature regulator 47. The piston rod guide 57 is part of the outer case 45. The top portion of the outer case housing the wax 41 is denoted as the upper cavity 58.

It can be seen that by varying the parameters of the impurities 56 content, and/or the composition of the impurities, and/or the tension of the pressure control spring that a range of temperature to pressure ratios can be created. Thus, the present invention teaches a general method to control pressure in response to varying temperatures. This method can be applied to a wide variety of applications including but not limited to beverage storage, volatile liquid storage, and liquid storage in outer space.

Figure 5:
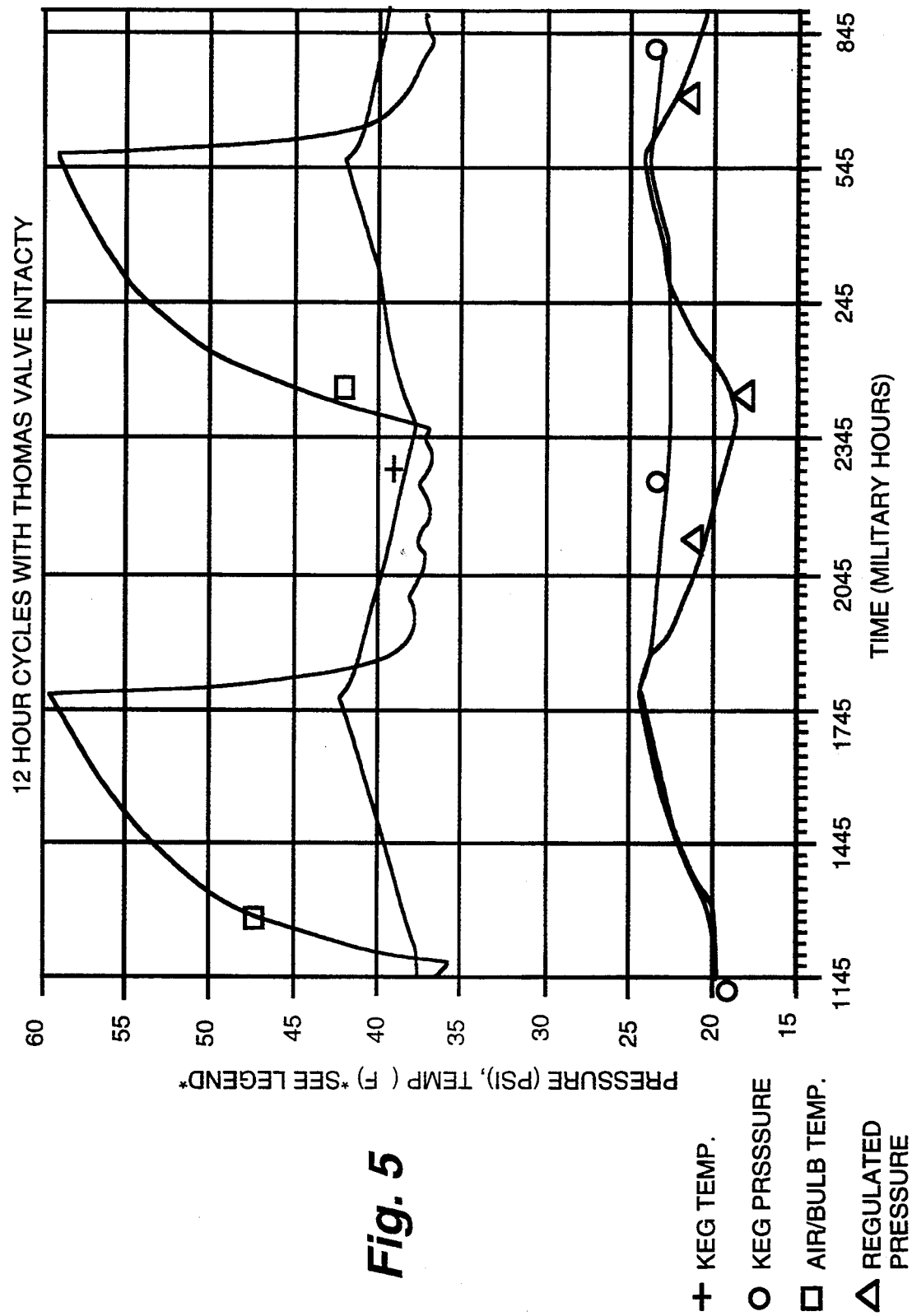
FIG. 5 is a chart of experimental results showing how the regulating valve maintains the proper pressure in response to ambient temperature changes.

Referring next to FIG. 5 the result of an experiment using the TCPR 101is shown. A Thomas valve was used as a back flow preventor.

It can be seen that as the ambient air temperature " " rose and fell over a twenty two hour period, the keg pressure "o" tracked the temperature changes in a predetermined manner so as to meet the beer manufacturer's standards for providing tasty, non-foaming beer.

Below follows the commercial installation and operation instructions for the TCPR 101:

The TCPR 101 has been designed to greatly reduce foam in beer caused by temperature fluctuations. The valve will automatically adjust the $CO_2$ supply pressure to the keg in relation to the temperature in the refrigeration unit. By following the instructions the valve should provide many years of trouble free operation. Please follow these instructions to insure proper installation.

CAUTION

Before starting make sure that the $CO_2$ shut off valve has been closed. DEATH BY ASPHYXIATION MAY OCCUR IF $CO_2$ IS ALLOWED TO ESCAPE.

PLACEMENT

For best results the valve should be mounted in an upright position with the dial face of the gauge in a readable location. Insure that the location is clear from moving items and that it is in a spot that is representative of the overall temperature of the refrigeration unit. This will normally be an area close to the keg. Do not place in an area where warm foods or supplies are normally stored. The supplied mounting bracket may be used to securely fasten the valve to the wall or other stable fixture.

HOOK UP

The TCPR 101 is designed to be used between the primary regulator and the keg. ¼" FNPT connections are supplied on the valve. After $CO_2$ has been shut off, use 2 ea. ¼" MNPT to barbed tube or similar fittings (not supplied) to install the TCPR 101 in the line between the primary regulator and the keg. Use TFE tape on any threads to prevent $CO_2$ leakage. Insure that the line is protected from any foreign object that may cut the tubing.

CALIBRATION

After installing the TCPR 101 in the $CO_2$ line, allow the valve to cool to normal refrigerator temperature. This will take about 20 to 30 minutes. The TCPR 101 WILL NOT OPERATE CORRECTLY UNLESS THIS IS DONE. Turn on the $CO_2$ supply and check for any leaks. Adjust the output supply pressure on the primary regulator to 30 psi. by following the manufacturers suggested operation instructions. The valve is now ready for calibration. DO NOT TOUCH THE TOP OF THE TCPR 101 as this will change the temperature calibration. Loosen the retainer nut on the temperature element and then adjust the output pressure by turning the element using the wrenching flats. The final setting should be that which is recommended by the brewer based on altitude and temperature for each name brand.

MAINTENANCE

The TCPR 101 should be maintenance free for many years with proper care. Do not spray with water or cleaners as this may inhibit the operation of the valve. Do not stack articles on or near valve.

Figure 6:
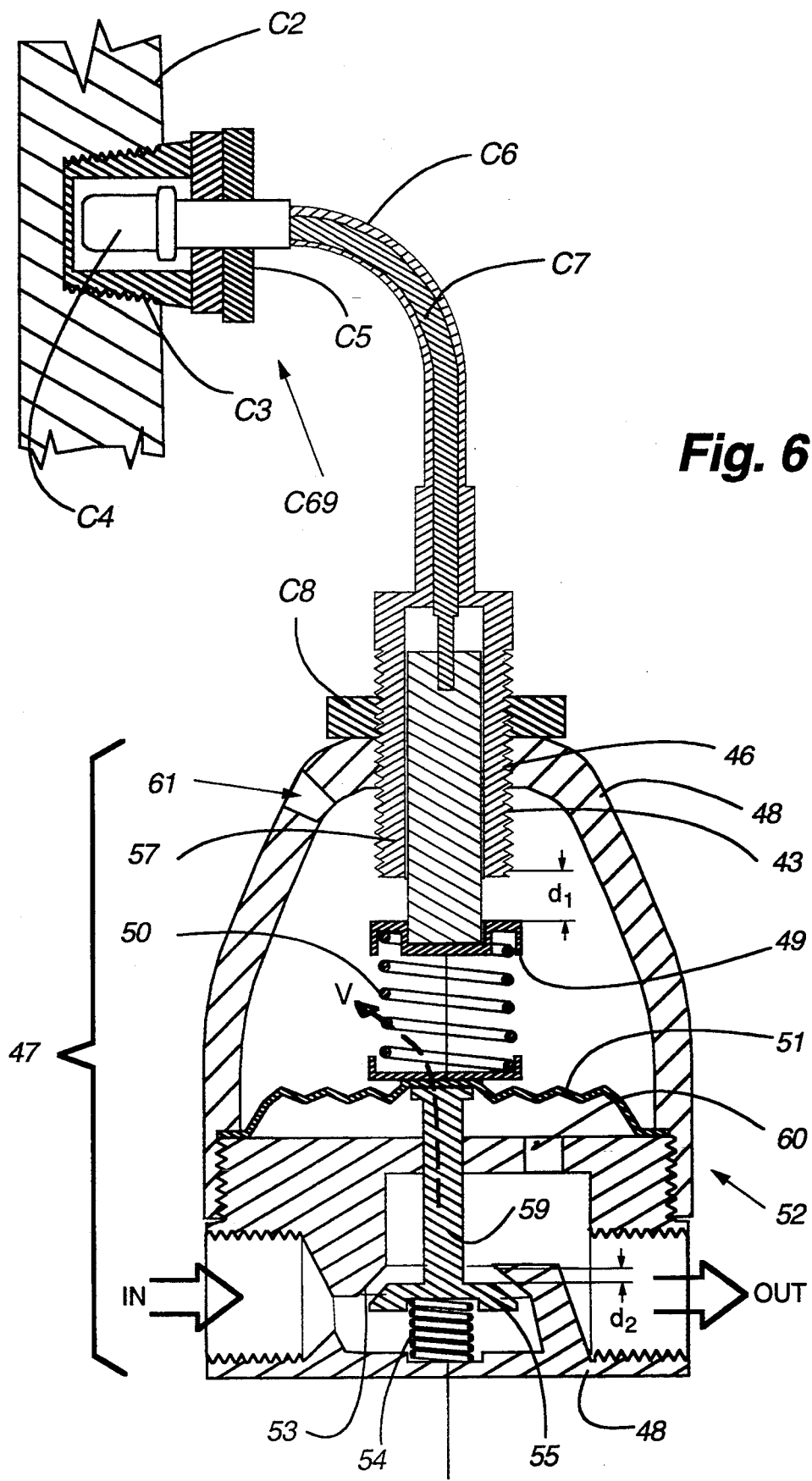
FIG. 6 is a longitudinal sectional view of the temperature compensating regulator of FIG. 4 with the modification of a cable and a remote wax element.

Referring next to FIG. 6 a pipe C2 is remote from miniature regulator C47. Like elements of FIG. 4 are labeled the same. A known thermoweld assembly C69 is affixed to the pipe C2. C3 indicates the thermowell. A temperature element C4 is the same wax element labeled 40 above. The internal piston (not shown) of temperature element C4 is affixed to the cable C7. Cable C7 has an external cable enclosure C6. A retainer nut C5 holds the external cable enclosure C6 to the thermoweld assembly C69. The adjustment nut C8 adjusts the cable tension with threads 46 inside the bonnet 48.

A cable extension C43 protrudes into the bonnet 48 in a similar fashion to the piston rod 43 of FIG. 4. Thus, temperature variations in pipe C2 cause the diaphragm 51 to change the output set pressure by means of the temperature element C4, cable C7, and cable extension C43.

Figure 7:
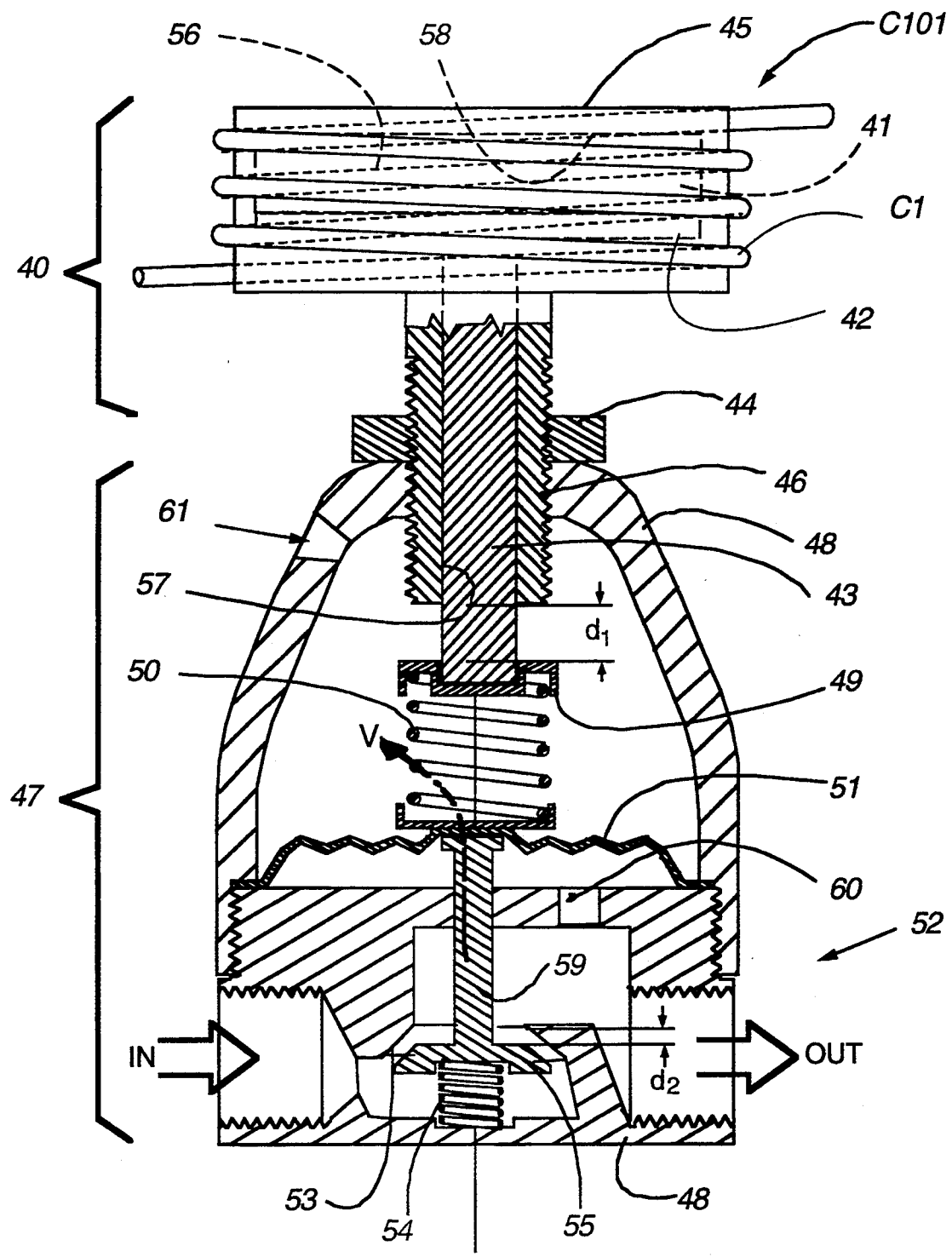
FIG. 7 is a longitudinal sectional view of the temperature compensating regulator of FIG. 4 with the modification of a heating coil around the wax element.

In FIG. 7 the temperature element 40 shown in FIG. 4 has been wrapped with a controllable electrical resistance coil C1. The electrical signal to the resistance coil C1 can be varied, thus causing the wax 41 to expand and/or contract. In this manner the piston rod 43 is controllably moved against the diaphragm 51. The overall effect of this embodiment is to provide a means of providing a control actuator by using an inexpensive wax element/regulator combination. The wax is chosen to react only to temperatures over 120° F. This avoids wax expansion during normal deviations in the ambient temperature.

Figures 8, 9:
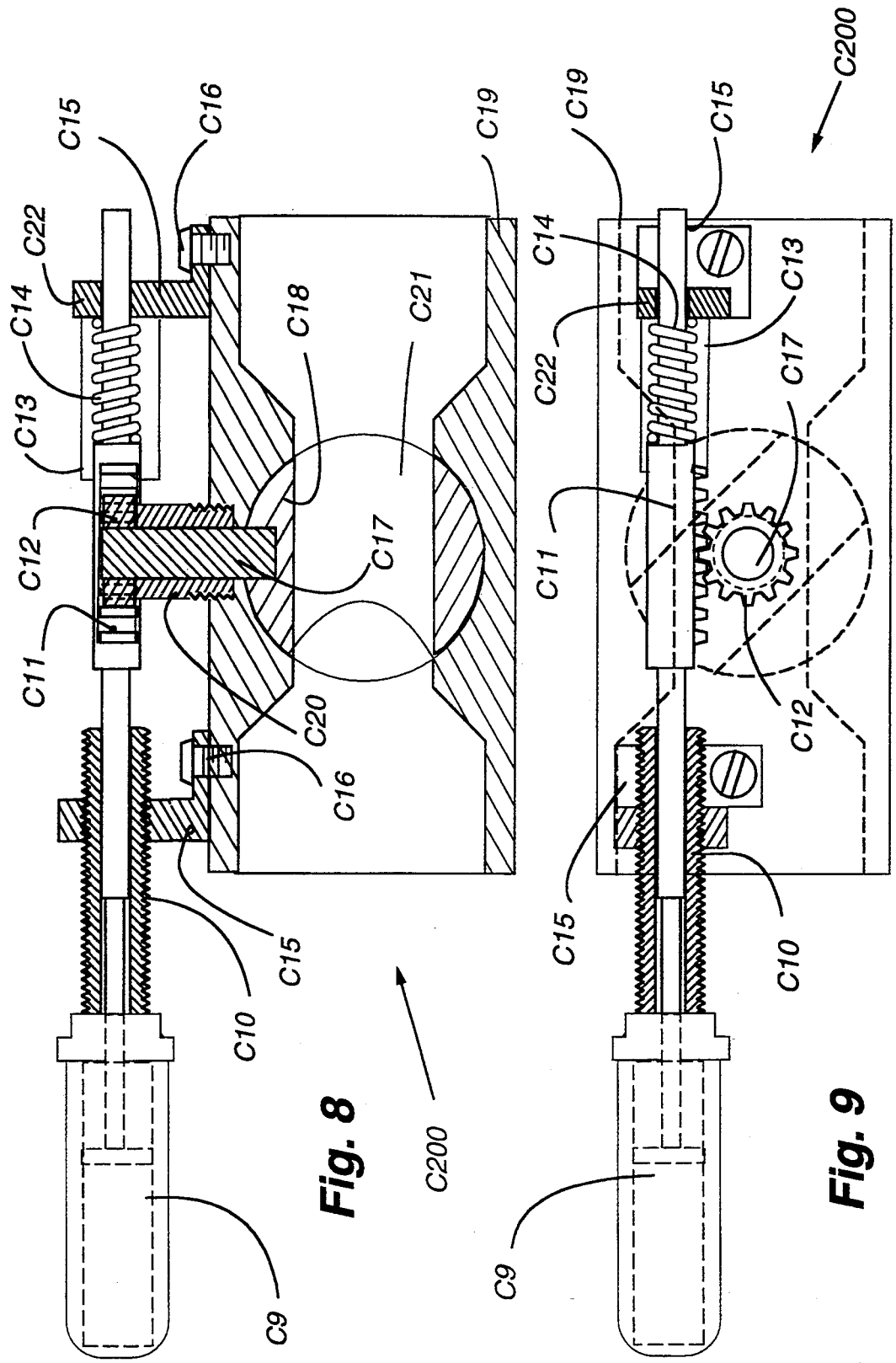
FIG. 8 is a longitudinal sectional view of a temperature compensating wax element in combination with a quarter turn ball valve.
FIG. 9 is a top view of the valve of FIG. 8.

Referring next to FIGS. 8, 9 a new combination is shown designated as the temperature shut off valve C200. In this embodiment a temperature element C9 is of the same construction as the wax based temperature element 40 of FIG. 4. The piston (not shown) of temperature element C9 is attached to the rack gear C11 which moves the round gear C12. A stroke adjustment means C10 allows for calibration of the rack gear C11 against the round gear C12. An enclosure C13 houses the spring 14 and rack guide bushing C22.

A valve body C19 houses a rotating valve ball C18 to open or close valve port C21 in a known manner. The valve stem C17 attaches the round gear C12 to the rotating valve ball C18. A stem seal C20 having threads C23 seals the moving valve stem C17.

The temperature element C9 is rigidly affixed to the valve body C19 by means of the actuator mount C15, and mounting screw C16.

In operation in applications such as swamp coolers or sprinklers, it is desirable to automatically shut off the temperature shut off valve C200 in freezing ambient temperatures. Therefore, the wax (not shown) of temperature element C9 is chosen to expand/contract around the freezing point of water (32° F.). As the wax contracts the rack gear C11 is pulled so as to close the quarter turn rotating valve ball C18. When warmer temperatures occur, the spring C14 returns the rotating valve ball to the open position. Thus, no electrical or other power is needed to shut off a valve at a selected temperature. These teachings are also applicable to hazardous industrial applications where electricity is undesirable.

Figure 10:
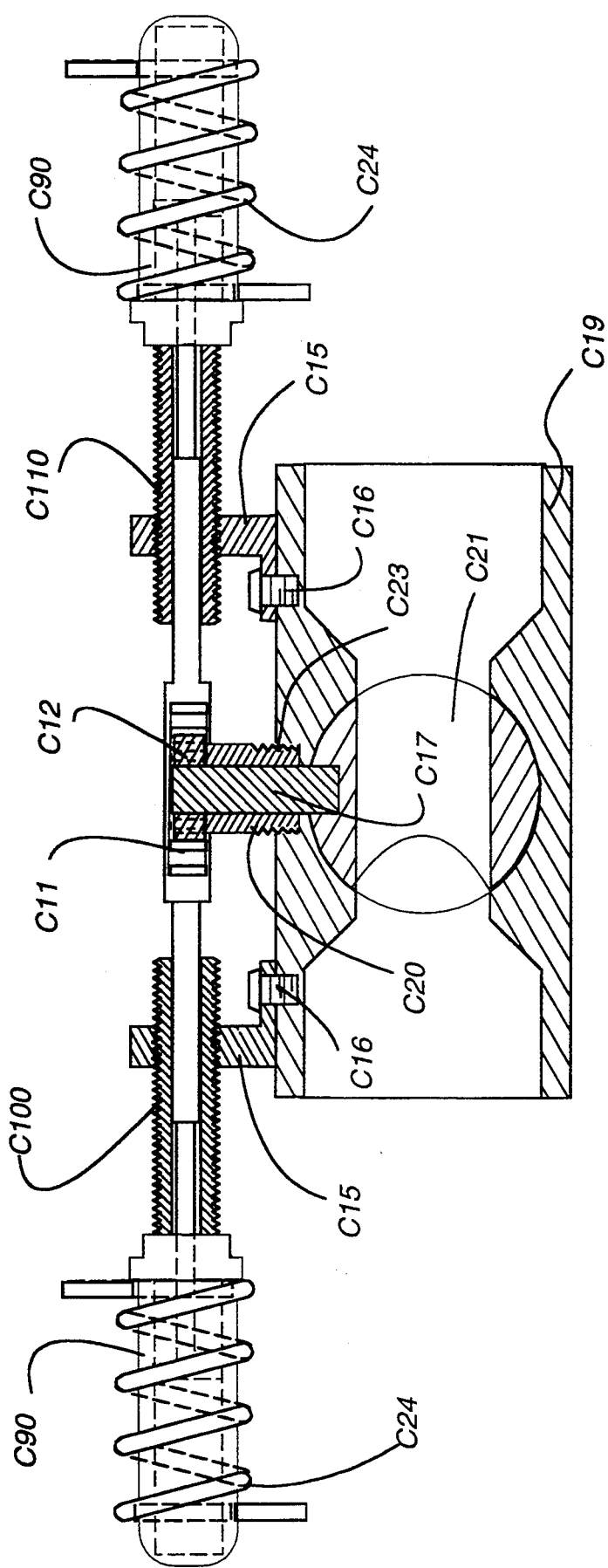
FIG. 10 is a longitudinal sectional view of a quarter twin ball valve having two temperature compensating wax elements.

Referring last to FIG. 10 the valve body C19 of FIG. 9 has been combined with a new actuator means. One application would be a well head throttling valve on a natural gas well head. It is undesirable to have paths for electrical arcs at the well head. The prior art teaches the use of a quarter turn valve having an electric motor actuator. Electric motors can short out and create sparks thereby creating a hazard. Expensive explosion proof housings are used with the electric motors. Other advantages to the present invention include a lower cost actuator C202 (comprising a pair of heat controlled temperature elements C90) and lower electrical consumption than an electric motor. The actuator C202 could be photo-voltaically powered.

In operation the heating coils C24 are of the type shown in FIG. 7 denoted C1. The amount of energy is varied to the heating coils C24 to cause the heat controlled temperature elements C90 to stroke the rack gear C110 as desired.

Not shown is an alternate embodiment replacing one of the heat controlled temperature elements with a spring.

KEY

1 - walk-in refrigerator
2 - door
3 - ambient air in walk-in refrigerator
4 - temperature sensor
5 - computer
6 - beer keg
7 - beer
8 - $CO_2$
9 - pressure cavity regulating
10 - pressure valve
11 - $CO_2$ pipe
12 - $CO_2$ tank
13 - draught beer output
24 - pressure sensor
40 - temperature element
41 - wax
42 - piston
43 - piston rod
45 - outer case
46 - threads
47 - miniature regulator
48 - bonnet
49 - spring guide
50 - pressure control spring
51 - diaphragm
52 - pressure reducing valve
53 - valve seat
54 - balancing spring
55 - valve plug
56 - copper impurities
57 - piston rod guide
58 - upper cavity
59 - valve stem
60 - pressure balancing proof
61 - vent hole through the bonnet
101 - temperature compensating pressure regulator (TCPR)
141 - pressure gauge
C1 - electrical resistance coil
C2 - pipe or other vessel
C3 - thermowell
C4 - temperature element
C5 - retainer nut
C6 - cable enclosure
C7 - cable
C8 - adjustment nut
C9 - temperature element
C10 - stroke adjustment
C11 - rack gear
C12 - round gear
C13 - enclosure
C14 - spring
C15 - actuator mount
C16 - mounting screw
C17 - valve stem
C18 - rotating valve ball
C19 - valve body
C20 - stem seal
C21 - valve port
C22 - rack guide bushing (rectangular)
C23 - stem seal threads
C24 - valve opening resistance healing coil
C43 - cable extension
C47 - miniature regulator
C69 - thermoweld assembly
C90 - heat controlled temperature element
C100 - stroke adjustment
C101 - heater coil wrapped regulator
C110 - dual wax element rack gear
C200 - temperature shut off valve
C202 - actuator
$d_1$ - distance piston rod 43 travels
$d_{10}$ - distance cable extension travels
$d_2$ - distance the valve plug 55 travels
IN - inlet port
OUT - outlet port
V - direction of venting gas if output pressure increases

I claim:

1. A pressure regulator for regulating the flow of a pressurized fluid responsive to temperature levels, said pressure regulator comprising:

a valve member having an inlet port for receiving the pressurized fluid, an outlet port, and a plug member positioned between the inlet port and the outlet port, the plug member actuatable into position alternately to block, or to permit, formation of a fluid connection between the inlet and outlet ports, respectively;

a supportive bonnet positioned about said valve member;

an enclosure supported above said valve member, said enclosure for holding a thermally-expansive material therein, the thermally-expansive material of volumetric dimension variable proportional to the temperature levels said enclosure having a downwardly-extending cylindrical guide formed at a bottom portion thereof and positioned to extend into said bonnet; and linkage structure for interconnecting said valve member witch said enclosure and the thermally-expansive material therein, said linkage structure translatable responsive to changes in the volumetric dimensions of the thermally-expansive material for causing actuation of the plug member into the positions alternately to block, or to permit, the formation of the fluid connection thereby to regulate the flow of the pressurized fluid wherein changes in the volumetric dimensions of the thermally-expansive material and changes in the flow of the pressurized fluid through said valve member are linearly related; and a locking element positioned about the cylindrical guide of said enclosure, said locking element for locking said enclosure in position together with said valve member.

2. The pressure regulator of claim 1 wherein said linkage structure comprises a piston having a piston head and a piston rod, the piston head positioned within said enclosure to abut against the thermally-expansive material, and the piston rod positioned to extend beyond said enclosure, said piston translatable responsive to the changes in the volumetric dimensions of the thermally-expansive material.

3. The pressure regulator of claim 1 wherein said linkage structure further comprises a rack and pinion gear combination having a rack with gear teeth and a pinion gear engageable with the gear teeth of the rack, the rack positioned to be translatable responsive to translation of the piston such that translation of the rack imparts motion to the pinion gear.

4. The pressure regulator of claim 3 wherein said valve member further comprises a valve stem for actuating the plug member into the positions alternately to block, or to permit, the formation of the fluid connection, said valve stem coupled to the pinion gear to move in unison therewith.

5. The pressure regulator of claim 3 wherein a first end of the rack of the rack and pinion gear is coupled to an end of the piston rod.

6. The pressure regulator of claim 5 further comprising a spring member positioned at a second end of the rack.

7. The pressure regulator of claim 6 further comprising a rack guide bushing supported upon said valve member, said rack guide bushing for receiving the second end of the rack and said spring member therein.

8. The pressure regulator of claim 1 wherein said valve member further comprises a valve stem for actuating the plug member into the positions alternately to block, or to permit, the formation of the fluid connection.

9. The pressure regulator of claim 8 further comprising a spring member positioned beneath an end portion of said cable whereat the second end portion of said cable abuts against said spring member.

10. The pressure regulator of claim 9 further comprising a diaphragm, said diaphragm positioned between said spring member and the valve stem of said valve member wherein translation of the cable responsive to translation of the piston is transmitted through said spring member and said diaphragm to the valve stem to ensure actuation of the plug member of said valve member.

11. The pressure regulator of claim 1 wherein said linkage structure further comprises a cable having a first end positioned to abut against an end of the piston rod and a second end positioned within said valve member, said cable translatable responsive to translation of said piston.

12. The pressure regulator of claim 2 wherein the plug member of said valve member comprises a rotary ball and wherein translation of said linkage structure causes rotation of the rotary ball alternately to block, or to permit, the formation of the fluid connection.

13. The pressure regulator of claim 1 further comprising a heating element positioned about said enclosure, said heating element for generating thermal energy for conduction through said enclosure to alter the temperature levels of the thermally-expansive material.

14. A pressure regulator for regulating the flow of a pressurized fluid responsive to temperature levels, said pressure regulator comprising:

a valve member having an inlet port for receiving the pressurized fluid, an outlet port, and a plug member positioned between the inlet port and the outlet port, the plug member actuatable into position alternately to block, or to permit, formation of a fluid connection between the inlet and outlet ports, respectively;

an enclosure for holding a thermally-expansive material therein, the thermally-expansive material of volumetric dimensions proportional to the temperature levels;

a piston having a piston head and a piston rod, the piston head positioned within said enclosure to abut against the thermally-expansive material and the piston rod positioned to extend beyond said enclosure, said piston translatable responsive to the changes in the volumetric dimensions of the thermally-expansive material;

a rack and pinion combination having a rack with gear teeth and a pinion gear engageable with the gear teeth of the rack, the rack coupled at a first end thereof to an end of the piston rod of said piston;

a spring member positioned at a second end of the rack; and a rack guide bushing supported upon said valve member, said rack guide bushing for receiving the second end of the rack and said spring member.

* * * * *